United States Patent
Milleville et al.

[11] 3,815,870
[45] June 11, 1974

[54] PLUG VALVE ASSEMBLIES

[75] Inventors: Bertram J. Milleville; Earl A. Bake, both of Pittsburgh; William G. Lunt, Monroeville, all of Pa.

[73] Assignee: Rockwell Manufacturing Company, Pittsburgh, Pa.

[22] Filed: May 26, 1972

[21] Appl. No.: 257,397

[52] U.S. Cl.............. 251/309, 251/85, 251/160, 251/181, 137/247.25
[51] Int. Cl............................................. F16k 5/02
[58] Field of Search .......... 251/309, 310, 311, 312, 251/313, 314, 315, 355, 368, 85, 158, 160, 182, 180, 181; 137/216.1, 216.2, 247.25, 250

[56] References Cited
UNITED STATES PATENTS

| | | | |
|---|---|---|---|
| 1,958,262 | 5/1934 | Boland | 251/160 |
| 2,263,454 | 11/1941 | Clade | 251/314 |
| 2,584,161 | 2/1952 | Scherer | 251/314 X |
| 2,649,275 | 8/9153 | Noyes | 251/160 X |
| 3,094,136 | 6/1963 | Bredtschneider et al. | 251/313 X |
| 3,130,953 | 4/1964 | Carpenter | 251/182 |
| 3,199,876 | 8/1965 | Magos et al. | 251/355 X |
| 3,241,809 | 3/1966 | Smith | 251/182 |
| 3,278,190 | 10/1966 | Wood et al. | 251/355 X |
| 3,362,433 | 1/1968 | Heinen | 251/309 X |
| 3,384,337 | 5/1968 | Brown | 251/309 X |
| 3,398,964 | 8/1968 | Trefil | 251/355 X |
| 3,424,190 | 1/1969 | Wolfensperger | 251/315 X |
| 3,525,363 | 8/1970 | Gore | 251/182 X |
| 3,620,502 | 11/1971 | Lawson | 251/355 |
| 3,623,696 | 11/1971 | Baumann | 251/85 |

Primary Examiner—Henry T. Klinksiek

[57] ABSTRACT

A non-lubricated tapered plug valve assembly for controlling flow of alumina slurries and like deposit forming substances has a rotatable wide angle torsionally elastic plug across the larger end of which extends a body chamber filled with thixotropic plastic sealant to effectively block entry of deposit-forming line fluid into the chamber, with provision for pressure relief to prevent assembly pressure locking as a result of cycling of line fluid temperature or pressure.

12 Claims, 2 Drawing Figures

PATENTED JUN 11 1974 3,815,870

PLUG VALVE ASSEMBLIES

This invention relates to non-lubricated plug valve assemblies and particularly to those assemblies used for controlling the flow of alumina slurry and like solid deposit forming substances.

So-called lubricated plug valves wherein viscous plastic lubricant or sealant material is distributed along grooves in the plug and body bore surfaces are not satisfactory in such services because the line deposits coat over or dislodge the lubricant and also tend to fill and block the grooves.

In its preferred embodiment the invention will be disclosed as incorporated in a non-lubricated tapered plug valve assembly wherein a relatively wide angle plug is rotatably mounted in a tapered body bore for movement between 90° apart open and closed positions. It has been found that in valves handling slurries of the foregoing type the plug is often frozen or stuck in closed or open condition due to solid hard or hardenable deposits and corrosion and that forces additional to and/or other than normal torque must be applied to rotate the plug.

In solution of the foregoing problem the invention contemplates providing a special relatively wide angle torsionally elastic tapered plug having an integral operating stem at its smaller end and having a generally fork shape in longitudinal cross section with widely diverging legs at opposite sides of a through port, the plug being preferably integrally formed of a high strength alloy steel. The metal cross section at the small end of these legs is less than in conventional plug valves of corresponding line size, so that upon application of torque at the stem to turn a stuck plug the torsional forces will first cause significant elastic twisting of the fork legs and gradually and progressively break the relatively brittle mineral deposit formation that is causing the plug to be frozen.

It is a major object of the invention therefore to provide a novel plug valve assembly wherein a wide angle torsionally elastic plug is rotatably mounted in a corresponding body bore.

Provision is also made for a small axial displacement of the tapered plug in the body bore to aid in freeing the plug and lowering the torque required to turn it. For this purpose there is a space in the valve body at the larger end of the tapered bore. Difficulties have been encountered arising from accumulation of solid slurry deposits within this space because when the space became filled with these solids such prevents axial displacement of the plug and also exerts a drag which increases the torque required to turn the plug. The invention contemplates a system for automatically preventing slurry and like solids from occupying this space and such is a major object of the invention.

A further object of the invention is to provide a tapered plug valve assembly having a novel system and apparatus for filling and maintaining filled the space between the large end of the plug and body with a thixotropic material under limited pressure to prevent or minimize entry of line fluid into that space.

Further and more specific objects of the invention will appear as the description proceeds in connection with the appended claims and the annexed drawings.

PREFERRED EMBODIMENTS

Figures 1, 2:
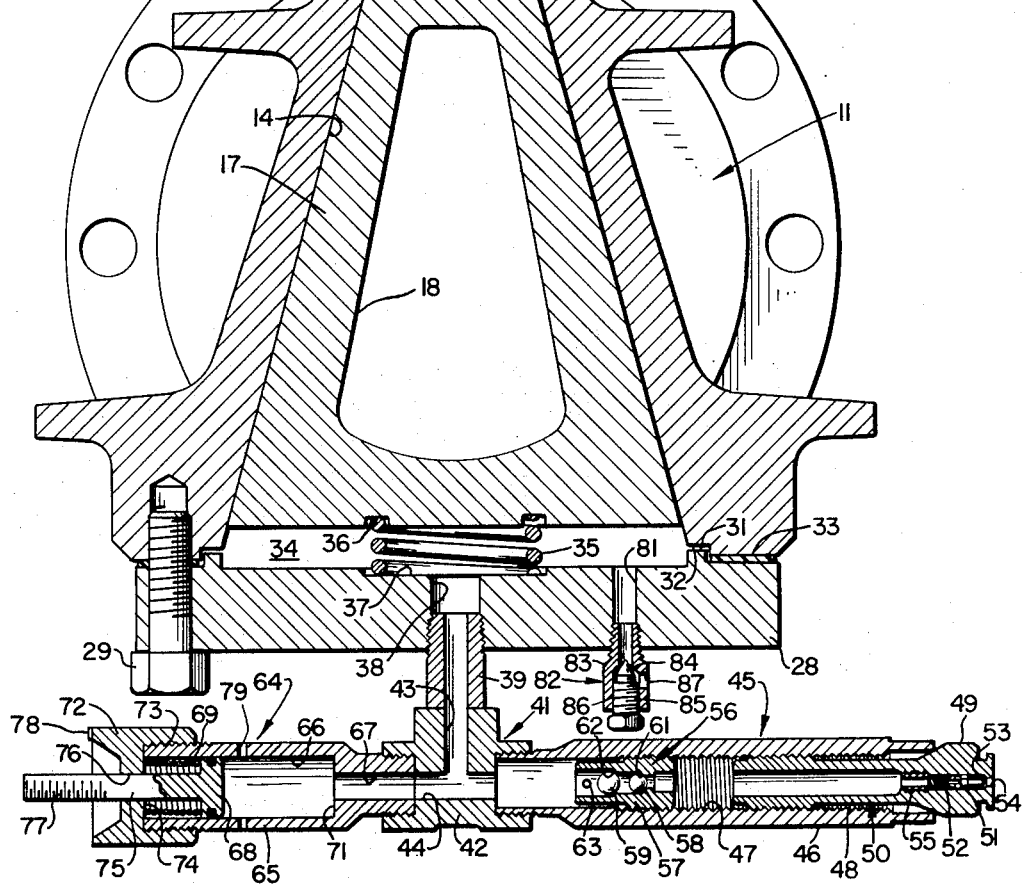
FIG. 1 is a plan view in section showing a valve incorporating the invention according to a preferred embodiment.
FIG. 2 is an enlarged side elevation mainly in section substantially on line 2—2 of FIG. 1 and particularly showing the arrangement for supplying and continually maintaining a body of fluent thixotropic material in the plug bore and chamber.

A non-lubricated plug valve assembly comprises a valve body 11 having aligned longitudinal through passage means 12 and 13 that at their inner ends intersect a transverse tapered body bore 14 at ports 15 and 16. As shown the bore 14 is of conical contour with its larger end at the bottom.

A tapered plug 17 of similar conical contour is rotatably mounted in bore 14, and plug 17 has a diametrical through passage 18 which in open valve position of the plug aligns with the body passage means to permit fluid flow therethrough, and in the 90° rotated closed valve position is disposed at right angles to the FIG. 1 position so as to block fluid flow through the valve passage means. There are no lubricant distribution grooves in the plug and bore surfaces.

At its upper reduced end plug 17 is integrally formed with a stem 19 that projects through a body opening 21 to terminate outside the body in a non-circular portion 22 adapted to receive a wrench or like operator for rotating the plug between open and closed valve positions.

Stem 19 is cylindrical and is surrounded within the body opening by a more or less conventional Chevron type packing 23 axially confined by a retainer ring 24 removably secured on the body as by machine screws 25, the medial region 26 of the packing being supplied with a fluent thixotropic sealant of the nature of a grease under pressure through a unidirectional fitting 27. Stem 19 is thus effectively journalled in a lubricated radial bearing, the pressurized lubricant also providing a seal along the stem to prevent leakage of line fluid and/or ingress of dirt or water.

A bottom cover 28 is removably secured over the larger end of bore 14 as by bolts 29, with an internal annular rib 31 piloted within a shouldered recess 32 at the end of the bore. A suitable fluid tight gasket 33 is disposed between the cover and body.

As shown in FIG. 2 there is a chamber 34 at the larger end of the bore inwardly of the cover, at least part of the chamber comprising the end of the bore 14. A coiled compression spring 35 is seated at opposite ends in opposed recesses 36 and 37 in the plug lower end and the inner surface of the cover respectively, at least one of these recesses being an annular groove concentric with the axis of rotation of the plug so that the spring is centered axially with the plug and has rotatable slidable association with the plug and cover at its opposite ends.

Spring 35 exerts sufficient force to balance the weight of plug 17 and to maintain the plug in rotative bearing contact with bore 14, the contacting surfaces of plug 17 and bore 14 being preferably smooth and fitted with a lapped finish.

As illustrated the longitudinal taper of the surface of plug 17, and the corresponding contacting surface of bore 14, is relatively steep, preferably in the order of about 15° to the axis of rotation, which is more than triple the taper of conventional plug valve assemblies.

The plug in the invention has metal-to-metal surface contact with its bore, and a relatively wide included angle of taper is provided to eliminate self-locking association. The invention provides progressive control of elasticity of the plug legs at opposite sides of the tapered opening by predetermined incremental increase in cross-sectional area of those legs from the smaller end of the plug, where the integral stem is joined and where the small end of the tapered port is located, toward the larger end of the plug. This involves correlation of such factors as the increase in diameter of the plug resulting from the wide angle of taper as well as the taper angle of the sides of the plug port which is relied upon to provide a scissors type crossing action with respect to the body port edges and the necessity of providing adequate cross-sectional area in the plug valve legs to prevent line pressure from forcing the legs into the valve body passage when the valve is closed. The invention minimizes the rate of increase of the cross-sectional area of the plug legs while providing the required progressive change in stiffness of the plug legs and observing the foregoing factors.

The plug 17 and its operating stem 19 are integrally formed from an elastic metal such as a high strength alloy steel. For example, a satisfactory steel is that known as AISI 4340 heat treated to have a minimum yield strength of about 130,000 pounds per square inch. As shown in FIG. 2, the plug sides diverge from the stem as relatively thin transverse section legs of a fork on opposite sides of through port 18, and this combination of the wide angle divergence, the relatively small section of the plug legs and the high strength alloy metal composition provides a torsionally elastic plug in which increasing torque at the stem will twist the plug legs progressively from the small end and therefore break the surface bond freezing of the plug progressively.

Means is provided for supplying a body of thixotropic material to fill chamber 34 and to maintain the chamber substantially filled in normal operation. By occupying this space this material prevents entry of the deposit-forming product flowing through the line and the valve into chamber 34 at the annular juncture of the lower end of the plug and the bore and thus prevents accumulation of line product deposits in chamber 34.

A through-opening 38 is formed in cover 28, and a short conduit 39 is secured in opening 38 to extend between the valve and a pressurized reservoir and dispensing unit 41. Advantageously the thixotropic material filling chamber 34 is the usual sealant and lubricant material used in lubricated plug valves for providing a lubricating and sealing film between the plug and bore surfaces.

Conduit 39 is secured to or may be integral with a T-fitting 42 that has a lateral outlet bore 43 intersecting through passage 44. At one end of passage 44, an injector device 45 is fixed to fitting 42. Injector device 45 comprises a hollow casing 46 threaded into fitting 42 and having an internally threaded section 47. At the outer end of casing 46 is mounted an injection fitting 50 comprising an externally threaded tube 48 at the outer end of which is an enlarged head 49 located outside the casing 46. Slidable within head 49 is a longitudinally grooved plunger 51 biased by a compression spring 52 onto a seat 53 where it normally closes an end opening 54. The inner end of spring 52 abuts a stationary thimble 55. Head 49 is externally formed for receiving a standard grease gun terminal whereby the grease-like material may be introduced under gun pressure which forces the plunger away from seat 53. The injector device may be of the type disclosed in U.S. letters Patent to Reiff No. 2,776,026.

At the inner end of casing 46 is mounted a check valve fitting 56 that permits the grease-like material to pass only in the direction toward fitting 42. Fitting 56 comprises a hollow externally threaded tube 57 mounted in threaded casing section 47 and internally containing spherical balls 58 and 59 having coacting seats 61 and 62 respectively and a retainer pin 63. Material under pressure from the injection fitting 50 will displace balls 58 and 59 sufficiently to discharge the material therethrough into the fitting 42.

At the other end of passage 44 a reservoir device 64 is fixed to fitting 42. Reservoir device 64 comprises a hollow tube 65 threaded into fitting 42 and having a cylindrical reservoir space 66 connected at its inner end by a passage 67 to the interior of fitting 42. A piston 68 is axially slidable within space 66 and is axially biased by a compression spring 69 toward the inner end wall 71 of space 66. A cap 72 is secured by threaded connection 73 onto the outer end of tube 65 and it provides an annular outer end wall 74 for space 66. The outer end of spring 69 seats on wall 74. Piston rod 75 rigid with piston 68 is slidable in a central bore 76 in cap 72 and projects outwardly therefrom. Preferably rod 75 is provided with indicator marks 77 coacting with an index 78 on the cap for indicating the volume of material in space 66. Radial ports 79 are provided in the wall of tube 65 for releasing excess sealant and thereby limiting sealant pressure in chamber 34 to a predetermined maximum value when temperature or pressure cycling in the line fluid would otherwise cause an excessive pressure build-up in that space. The ports 79 provided in tube 65 thus relieve excess sealant pressure after the valve has been placed in operation and the body which may have expanded because of line fluid temperature and/or line pressure contracts to reduce the volume of bore 14. The spring biased piston 68 maintains a constant pressure on the sealant in space 66, which pressure if increased above the predetermined maximum as a result of contraction of body bore 14, is released by expelling sealant through ports 79.

Cover 28 is also provided with a bleed opening 81 from chamber 34 normally closed by a needle-type valve unit 82 comprising a hollow body 83 having an internal valve seat 84 for the tip of a rotatable valve element 85 threadedly mounted at 86 on the body. The bleed valve is shown in closed condition, and valve element 85 may be rotated to unseat it and permit discharge of material from chamber 34 through outlet 87.

In operation, a gun loaded with the thixotropic sealant material is attached to head 49 and the material is forced under pressure through the injector fitting 50 and check valve fitting 56. This material enters T-fitting 42 from which it normally first rises into chamber 34. When the space within the chamber 34 is filled the material starts to enter space 66 and the pressure of the material displaces piston 68 to the left in FIG. 2 and a reserve supply of the material collects in space 66. This continues until chamber 34 and space 66, as well as the passages downstream of the check valve are filled and the gun is removed. Projection of the piston rod indicates this condition, and the marks 77 may be graduated in terms of volume of space 66.

Now the sealant material inwardly of check valve 56 is subject to continual pressure exerted by spring biased piston 68 and should any of the material leave chamber 34 it will be automatically renewed from the reservoir. The pressure in chamber 34 should be high enough to accomplish the foregoing but not so high as to exert an excessive thrust force in the axial plug seating direction. Check valve 56 will prevent the material from reentering the injection device.

The foregoing arrangement insures that the chamber 34 remains filled with sealant material even though the valve may undergo considerable expansion due to high temperature on and off operation. The sealant pressure is not high enough to materially resist axial displacement of plug 17 necessary to free the plug. Sealant material displaced by axial movement of the plug merely tends to flow toward the reservoir and after the axial force is removed the reservoir piston pressure acts to restore material in the chamber.

While a grease gun type fitting is disclosed at injector device 45, it is within the scope of the invention to provide an injector of the type wherein individual lubricant sticks are inserted and pressurized, such as is used for providing lubricant reservoirs in lubricated plug valves. For example such a lubricant stick injector is disclosed in Scherer U.S. Pat. No. 2,658,713.

Preferably the sealant pressure in chamber 34 is about equal to the pressure of the fluid in the pipeline containing the valve assembly. This means that the sealant establishes a pressure barrier all around the lower edge of the annular film thickness bearing space between the larger lower end of the plug and the body bore, so that there is no flow of line fluid and no passage of sealant through that annular space.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by letters Patent is:

1. A plug valve assembly comprising a body having a through passage intersected by a tapered bore and a tapered elastic metal plug having a through port rotatably mounted in said bore for movement between a valve open position wherein said port is aligned with said passage and a valve closed position wherein said plug blocks fluid flow along said passage, said plug having an integral stem extending from its smaller end and journalled through a body opening, said through port being partially bounded by a pair of plug legs joined with said stem at the smaller end of said plug and gradually increasing in radial thickness over a length of said legs extending from the smaller end of said plug toward the larger end thereof, the rate of increase in the radial thickness of said plug legs being so related to the cross sectional area of said stem that upon seizure of said plug in said bore an increasing torque applied to said stem will torsionally twist said plug legs adjacent the smaller end of said plug whereby the forces resisting rotation of said plug may be progressively broken from the smaller end of said plug toward the larger end thereof.

2. The plug valve assembly defined in claim 1, wherein said plug is integrally formed of a high strength alloy steel.

3. The plug valve assembly defined by claim 1, further comprising a chamber formed between the larger end of said plug and a cover fixed to said body, said chamber being completely filled with a mass of thixotropic sealant material blocking fluid access to said chamber.

4. The plug valve assembly defined by claim 3 wherein said chamber is connected by a continually open passage to a reservoir of thixotropic sealant material including means responsive to sealant pressure variations in said chamber to maintain the sealant material in said chamber at a pressure approximating the pressure of the fluid controlled by said plug valve.

5. The plug valve assembly defined by claim 1 wherein the tapered peripheral surfaces of said plug and said bore are coextensive continuous smooth peripheral surfaces in rotative radial bearing contact with one another and the diameter of said stem is not substantially less than the diameter of the smaller end of said plug.

6. A plug valve assembly comprising a body having a through passage intersected by a tapered bore and a tapered plug having a through port rotatably mounted in the bore for movement between a valve open position wherein the port is aligned with said passage and a valve closed position wherein the plug blocks fluid flow along said passage, said plug and bore having coextensive continuous smooth peripheral surfaces in rotative radial bearing contact characterized by said plug having at its smaller end an integral stem which slidably and rotatably extends through an opening in the body, means defining a body chamber between the larger end of the plug and said body for permitting axial displacement of the plug in said bore, and means on the body for introducing thixotropic sealant material to occupy said chamber and block fluid access to said chamber.

7. The plug valve defined by claim 6, including means for maintaining said sealant material in said chamber at a pressure approximating the pressure of the fluid controlled by said plug valve.

8. The plug valve assembly defined by claim 7, including means for replenishing loss of sealant material from said chamber during valve operation.

9. The plug valve assembly defined by claim 7, wherein said means for maintaining said sealant material at said pressure comprises a reservoir of thixotropic sealant material connected by a continually open passage to said chamber and means for continually biasing flow of said material through said passage toward said chamber.

10. The plug valve assembly defined by claim 9, wherein said biasing means comprises a spring biased piston in said reservoir energized by introduction of sealant material into said reservoir and responsive to an increase in the sealant pressure above a predetermined pressure to open a port and relieve excess sealant pressure.

11. The plug valve assembly defined by claim 9, wherein said reservoir includes a normally closed port and said means for maintaining said sealant material at said pressure includes means responsive to an increase in sealant pressure at said reservoir above a predetermined value to open said port and discharge sufficient sealant material to relieve the excess sealant pressure.

12. In the plug valve assembly defined in claim 6, a cover on said body at the larger end of said bore and closing said chamber, an opening in said cover through which sealant material may be introduced into said chamber, a fitting attached to said opening, means for injecting sealant material through said fitting into said chamber, and means for maintaining pressure of said material in said chamber comprising reservoir means connected to said chamber and connected to receive material introduced through said fitting and store it under pressure.

* * * * *